Jan. 8, 1924.

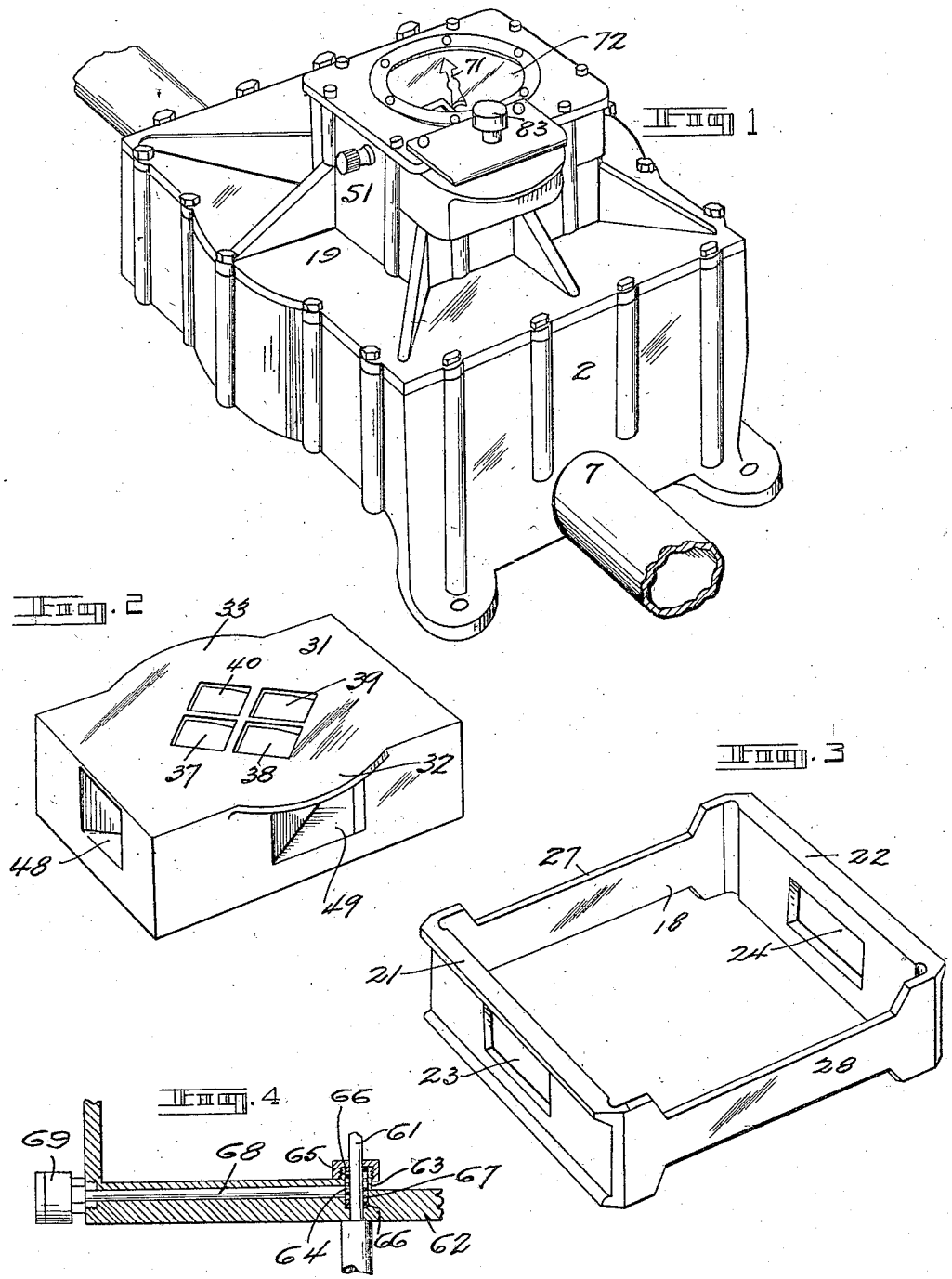

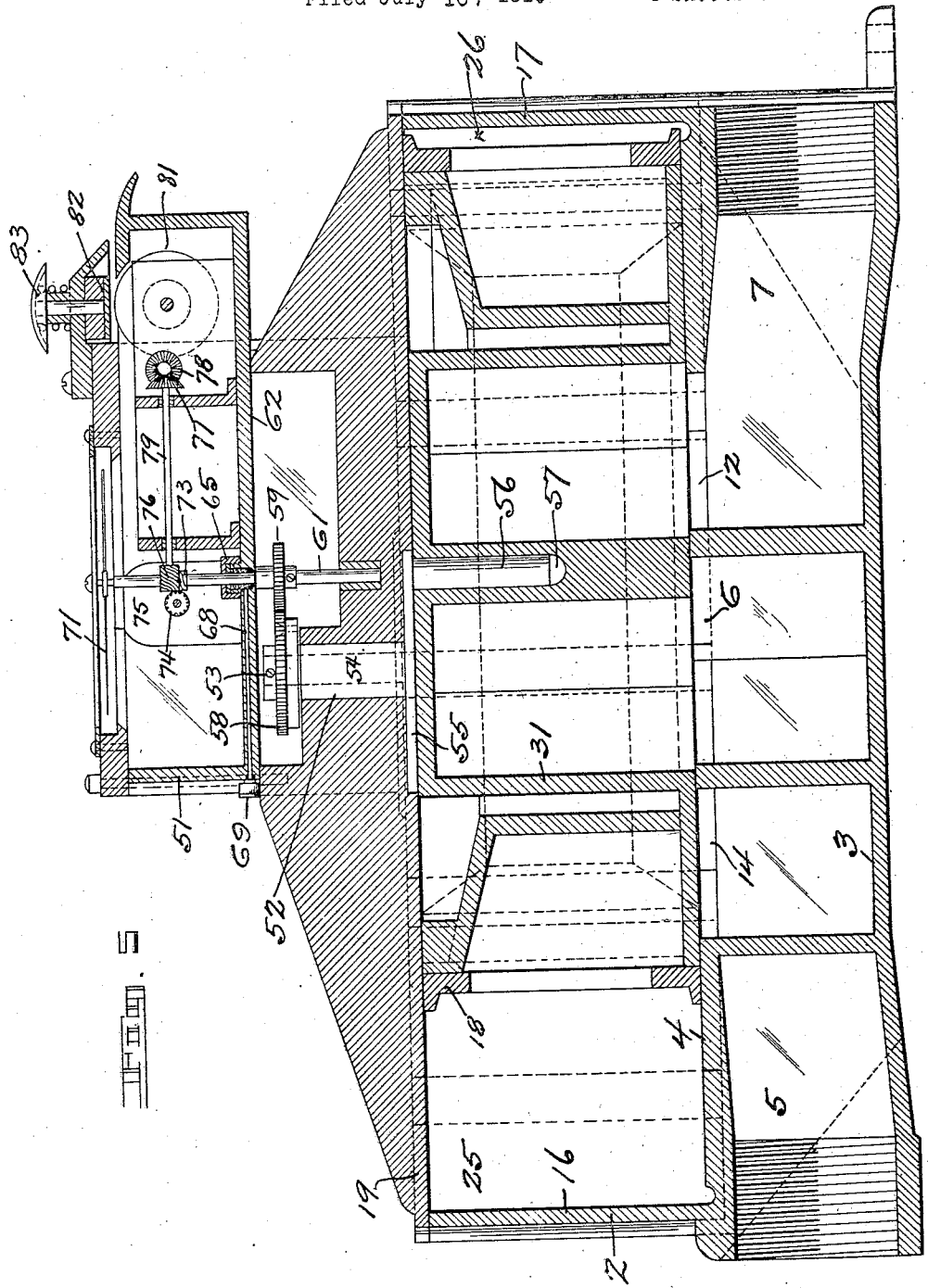

A. J. GRANBERG

FLUID METER

Filed July 16, 1919

WITNESS
H. G. Sherburne

INVENTOR.
A. J. GRANBERG
BY White & Prost
his ATTORNEYS.

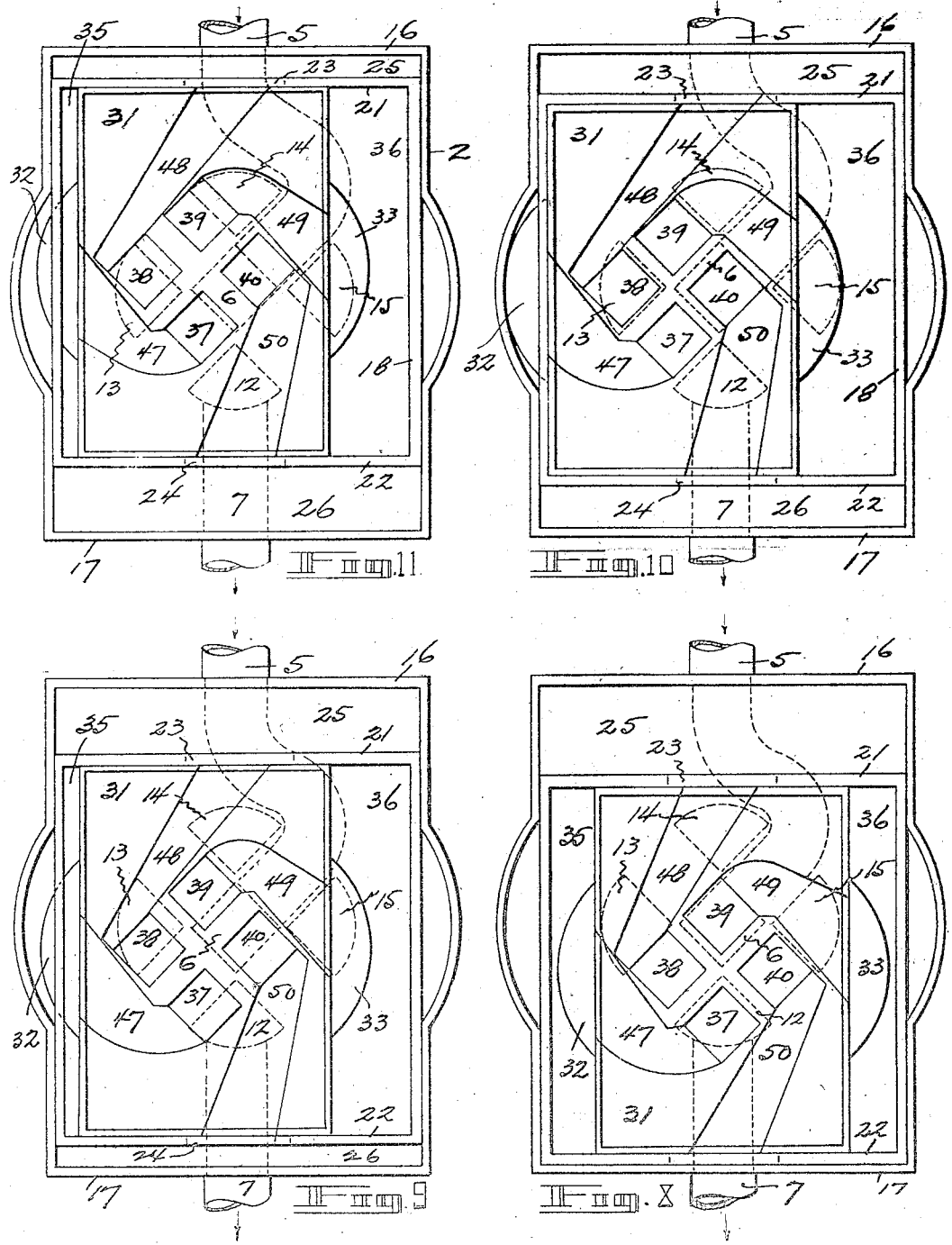

Patented Jan. 8, 1924.

1,479,961

UNITED STATES PATENT OFFICE.

ALBERT J. GRANBERG, OF SAN FRANCISCO, CALIFORNIA, ASSIGNOR TO THE GRANBERG METER COMPANY, OF SAN FRANCISCO, CALIFORNIA, A CORPORATION OF CALIFORNIA.

FLUID METER.

Application filed July 16, 1919. Serial No. 311,124.

*To all whom it may concern:*

Be it known that I, ALBERT J. GRANBERG, a citizen of the United States, and a resident of the city and county of San Francisco and State of California, have invented a certain new and useful Fluid Meter, of which the following is a specification.

The invention relates to fluid meters for measuring and recording the flow of fluid.

An object of the invention is to provide a meter which will accurately record the volume of fluid passing therethrough.

Another object of the invention is to provide a fluid meter which may be readily adjusted to cause it to meter correctly in the event that it is out of correct adjustment.

Another object of the invention is to provide a meter having a printing or stamping mechanism whereby the meter reading may be printed or stamped on a tag.

The invention possesses other advantageous features, some of which, with the foregoing, will be set forth at length in the following description where I shall outline in full, that form of the invention which I have selected for illustration in the drawings accompanying and forming part of the present specification. In said drawings, I have shown one specific form of the meter of my invention, but it is to be understood that I do not limit myself to such form, since the invention, as expressed in the claims, may be embodied in a plurality of forms.

Referring to said drawings:

Figure 1 is a perspective view of the meter.

Figure 2 is a perspective view of the meter head inverted.

Figure 3 is a perspective view of the slide.

Figure 4 is a detail cross-section of a portion of the meter, showing a packing gland.

Figure 5 is a vertical longitudinal section through the meter.

Figures 8, 9, 10 and 11 are somewhat diagrammatic views of the meter mechanism, showing the parts in successive positions.

Figure 6:
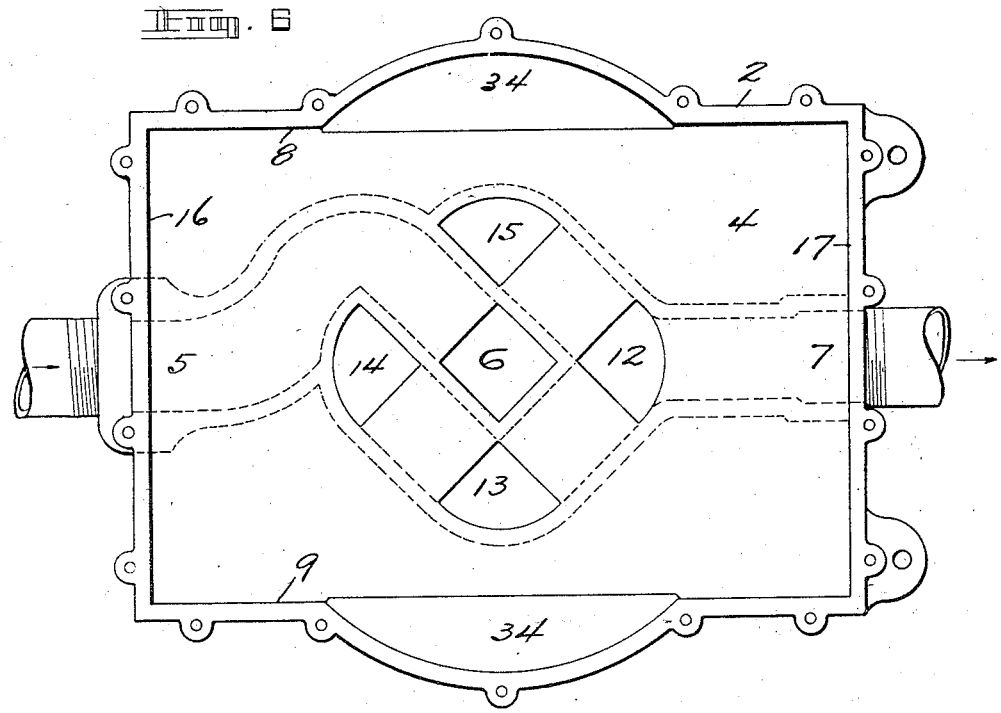
Figure 6 is a plan or top view of the meter casing.
Figure 7:
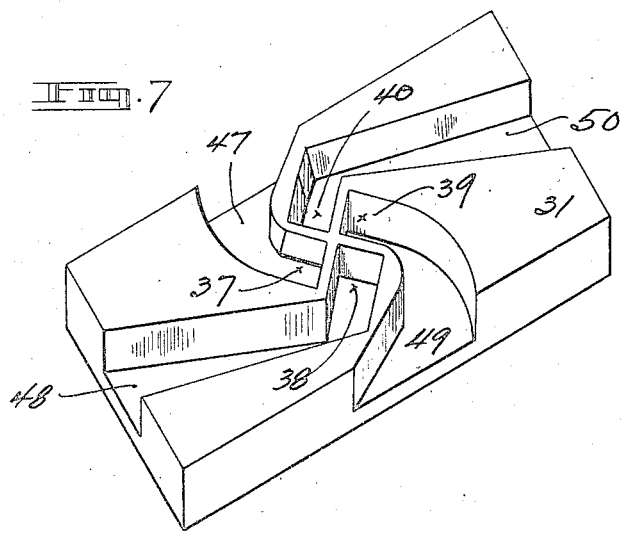
Figure 7 is a perspective view similar to Figure 2, with the upper portion of the inverted head cut away to disclose the passages therein.

The meter of my invention comprises a casing 2, preferably formed of metal, having a double bottom formed by the walls 3—4, and having walls extending above the bottom 4 and enclosing a chamber. The casing is provided with a fluid inlet passage 5, formed below the bottom 4, which opens into the inlet port 6 disposed centrally in the bottom 4, which port is preferably rectangular in shape. The casing is also provided below the bottom 4 with an outlet passage 7 into which the fluid passes from the chamber through the outlet ports 12, 13, 14, 15 in the bottom 4. The outlet ports are preferably sector shaped and are spaced apart regularly around the inlet port, with the apices of the outlet ports lying adjacent the corners of the inlet port. The fluid enters the chamber through the inlet port, passes through the metering mechanism therein, and discharges through one or more of the outlet ports.

The casing is provided with parallel side walls 8—9, springing from the bottom 4 and with end walls 16 and 17. Disposed within the casing and forming a sliding joint with the parallel side walls 8 and 9 is a slide-frame 18, which is shorter than the casing so that it is capable of limited longitudinal movement with respect thereto. The casing is closed at the top by the cover plate 19 and the end walls 21—22 of the slide frame form sliding joints with the bottom 4 and the cover plate. The end walls of the slide-frame are parallel to each other and are provided centrally with ports 23—24 to permit the flow of fluid into and out of the chambers 25—26 formed in the casing between the end walls thereof and the end walls of the slide-frame. The side walls 27—28 of the slide-frame are cut away at the top and bottom for reasons which become apparent hereinafter.

Disposed within the slide frame and forming a sliding joint with the end walls 21—22 thereof, is a meter head 31, preferably formed of metal, of less width than the slide-frame, so that it is capable of limited transverse movement with respect thereto. The meter head forms a sliding joint with the bottom 4 and the cover plate 19 and is provided at its lower edge on the opposite transverse sides thereof, with curved wings or shields 32—33 which overlie and close certain outlet ports during the operation of the meter. These shields pass under the side walls of the slide-frame and extend into pockets 34 in the casing, formed for that purpose. During the operation of the meter, the meter head slides back and forth transversely in the slide-frame, varying the size of the chambers 35—36 formed between the side walls of the frame and the sides of the meter head. The meter head reciprocates transversely in the slide frame and the slide frame reciprocates longitudinally in the casing, causing a circular movement of the meter head with respect to the casing.

The meter head is provided centrally on its under side with four ports 37—38—39—40, preferably rectangular in shape, which, during the operation of the meter, register separately and at different times with the various inlet and outlet ports in the bottom 4. The meter head is also provided with passages 47, 48, 49, 50, communicating respectively with the ports 37—38—39—40 and opening respectively on the four sides of the head. The entering fluid passes up through the inlet port 6, through certain of the passages 47, 48, 49, 50 filling the chambers within the casing out from other chambers through certain other of the passages 47, 48, 49, 50 and certain outlet ports 12, 13, 14, 15 to the discharge passage 7. This flow of the fluid causes a movement of the meter head in a circle with respect to the casing and this movement is transferred to indicating and recording devices.

Secured to or formed integral with the cover plate 19, is a housing 51 enclosing the indicating and recording mechanism. Journaled in the cover plate is a sleeve 52 having a bore formed eccentrically therein, and fitting in and secured to the sleeve, by a set screw 53, is a pin 54 which is centrally secured to the disc 55. The disc is provided adjacent its periphery with a pin 56 which bears within a bore 57 in the meter head. As the meter head moves in a circular path, the sleeve 52 is rotated. The diameter of the circular path of the meter head, and, consequently, the amount of fluid passing through the meter for each complete circular movement of the head, may be varied, by slightly turning the eccentric sleeve on the pin 54. This adjustment of the sleeve varies the distance between the center of rotation of the disc and the axis of the pin 56 and consequently varies the diameter of the circular path of the meter head. The meter can therefore be readily adjusted to vary or correct its rate of recording in proportion to the volume of fluid passing therethrough.

Secured to the sleeve 52 is a gear 58 which meshes with a gear 59 secured to the spindle 61. The spindle is journaled at one end in the cover plate and extends through the bottom wall 62 into the housing 51. To prevent the entry of fluid into the housing 51, the joint between the wall 62 and the spindle 61 is sealed, and the sealing means is of such nature, that it will not be dissolved or otherwise affected by the fluid and at the same time permit the ready rotation of the spindle. The wall 62 is provided with a stud 63 having a bore 64 therein through which the spindle passes and the stud is closed at the top by the apertured cap 65. Arranged within the bore and surrounding the spindle are annular washers 66, which are pressed against the cap and the bottom of the bore respectively by the spring 67. The wall is provided with a passage 68 connecting the bore with a compression cup 69 arranged on the outside of the housing. The cup is filled with a material or compound that is not affected by the fluid and by turning the cup, the compound is forced through the passage 68 into the bore, where it surrounds and forms a leak proof joint with the spindle. The washers prevent the escape of the compound along the spindle and the compound seals the joint.

The spindle is provided on its upper end with an indicator 71 movable over the dial 72 and is connected by the gears 73—74 with the counter or register 75, which records the number of units of fluid which have passed through the meter. The spindle is also connected by the gears 76—77 and 78, and the spindle 79 with the printing wheels or die wheels 81, which project through an aperture in the housing. Arranged above the die wheels is a stamping pad 82 and by placing a tag between the die wheels and the pad and striking the plunger head 83, the figures on the die wheels are imprinted on the tag. This feature is particularly advantageous when the meter is used on tank wagons or at dispensing stations, where the tag may be stamped before the fluid is dispensed and again after it has been dispensed, the difference between the two readings being the amount dispensed.

The operation of the meter will now be set forth, particular reference being made to Figs. 8 to 11 inclusive, these figures showing successive positions of the slide frame and meter head. In Fig. 8, the fluid flows through the inlet passage 5, and the inlet port 6, port 39 and passage 49, into the chamber 36, moving the meter head to the left and forcing fluid from chamber 35, through the passage 47, port 37, and outlet port 12 to the discharge passage 7. Outlet ports 13, 14 and 15 are closed in this position. As the meter head is moved to the left, as shown in Figure 9, port 40 is moved into communication with inlet port 6 and port 38 is moved into communication with outlet port 13. The fluid then enters through ports 39 and 40 and passes into chambers 36 and 26, causing a movement of the head to the left, and an upward movement of the slide. Fluid from chamber 35 discharges as before and fluid from chamber 25 passes through the passage 48, port 38, and outlet port 13 to the discharge passage 7.

This movement continues until the parts reach the position shown in Figure 10, in which the slide has reached the limit of its movement to the left. In this position port 39 has moved out of communication with inlet port 6 and is approaching outlet port 14. Fluid now flows into chamber 26 only, moving the slide upward and forcing fluid from chamber 25 through the discharge port 13.

Upward movement of the slide brings port 37 into communication with inlet port 6 and port 39 into communication with outlet port 14, as shown in Fig. 11, while maintaining communication between the other ports as set forth in connection with Fig. 10. With the parts in the position shown in Fig. 11, fluid flows into chambers 26 and 35 and discharges from chambers 25 and 36, causing an upward movement of the slide and a movement of the head to the right. The movement of the head covers and uncovers the inlet and outlet ports in their proper order to secure the alternate filling and emptying of the chambers in such order as to cause a movement of the head in a circular path. The amount of fluid passing through the meter at each cycle of movement of the meter head is equal to the amount of fluid displaced from the four chambers 25, 26, 35 and 36 and this amount depends upon the stroke of reciprocation or the diameter of the circle of movement of the meter head.

I claim:

1. The combination with a casing having opposite and parallel walls and having an inlet port and a plurality of outlet ports, of a frame slidable longitudinally in said casing, a meter head arranged within said frame and slidable transversely with respect thereto having a plurality of ports adapted to register at different times with the inlet port and outlet ports and having passages therein connected to the ports therein and opening on the sides of the head, and projections on the head adapted to cover certain outlet ports.

2. The combination with a casing having opposite and parallel walls and having an inlet port and four outlet ports in its bottom wall, the outlet ports being spaced regularly around the inlet port, of a frame slidable longitudinally in the casing, a meter head arranged within said frame and slidable transversely with respect thereto having four ports adapted to register at different times with the inlet port and the outlet ports and having passages therein connected to the ports therein and opening on the four sides of the head.

3. The combination with a casing having opposite and parallel walls and having an inlet port and four outlet ports in its bottom wall, the inlet port being arranged in the center of the bottom wall and the outlet ports being spaced regularly around the inlet port, of a frame slidable longitudinally in the casing, a meter head arranged within said frame and slidable transversely with respect thereto, having four ports in its bottom wall regularly spaced about the center thereof and adapted to register at different times with the inlet port and one or more of the outlet ports and having passages therein connected to the ports therein and opening on the four sides of the head.

In testimony whereof, I have hereunto set my hand at San Francisco, California, this 9th day of July 1919.

ALBERT J. GRANBERG.

In presence of—
W. W. HEALEY,
H. G. PROST.